(12) United States Patent
Craciun et al.

(10) Patent No.: US 10,331,834 B2
(45) Date of Patent: Jun. 25, 2019

(54) OPTIMIZING THE ORDERING OF THE INPUTS TO LARGE COMMUTATIVE-ASSOCIATIVE TREES OF LOGIC GATES

(71) Applicant: Synopsys, Inc., Mountain View, CA (US)

(72) Inventors: Bogdan Craciun, Sunnyvae, CA (US); Brent Gregory, Cupertino, CA (US); Jaime Wong, San Jose, CA (US); William Clark Naylor, Jr., San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 15 days.

(21) Appl. No.: 15/630,885

(22) Filed: Jun. 22, 2017

(65) Prior Publication Data

US 2018/0004862 A1    Jan. 4, 2018

Related U.S. Application Data

(60) Provisional application No. 62/357,207, filed on Jun. 30, 2016.

(51) Int. Cl.
*G06F 17/50*    (2006.01)

(52) U.S. Cl.
CPC ........ *G06F 17/505* (2013.01); *G06F 17/5072* (2013.01); *G06F 17/5077* (2013.01)

(58) Field of Classification Search
CPC .................................................... G06F 17/505
USPC .................... 716/102, 103, 132, 136; 703/15
See application file for complete search history.

(56) References Cited

U.S. PATENT DOCUMENTS

| | | | | |
|---|---|---|---|---|
| 5,471,398 A | * | 11/1995 | Stephens ............. | G06F 17/5045 716/104 |
| 6,317,864 B1 | * | 11/2001 | Kikuchi .............. | G06F 17/5068 716/122 |
| 2017/0061054 A1 | * | 3/2017 | Kalafala ............. | G06F 17/5045 |

* cited by examiner

*Primary Examiner* — Phallaka Kik
(74) *Attorney, Agent, or Firm* — HIPLegal LLP; Judith Szepesi (57) ABSTRACT

A method of optimizing a netlist for a circuit comprising identifying a logic tree with a single output and a plurality of interchangeable inputs, and calculate the optimal permutation of the plurality of inputs. The method further comprising modify the netlist based on the optimal permutation, and optimizing the modified netlist.

20 Claims, 8 Drawing Sheets

OPTIMIZING THE ORDERING OF THE INPUTS TO LARGE COMMUTATIVE-ASSOCIATIVE TREES OF LOGIC GATES

RELATED APPLICATION

The present application claims priority to U.S. Provisional Application No. 62/357,207, filed on Jun. 30, 2016, and incorporates that application in its entirety.

FIELD

The present invention relates to circuit design, and more particularly to ordering inputs to large associative-commutative trees of logic gates.

BACKGROUND

Modern VLSI circuits often contain sets of logical instances which are arranged in a tree-like structure, with the single output of this set being the root of the tree and the inputs (representing the leaves) being interchangeable (associative-commutative) from a logical (functional) perspective. While the choice of how the rest of the circuit connects to the inputs of this tree does not matter from the functional perspective, these connections can greatly affect the quality of the resulting placement and routing. The decisions tend to be made early on in the design process when no physical information is available.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

The present application addresses a circuit design technical problem, which occurs when large circuits are automatically placed and routed. While the choice of how the rest of a circuit connects to the inputs of an associative-commutative logic tree does not matter from the functional perspective, these connections can greatly affect the quality of the resulting placement and routing. The design can be improved by permuting these associative-commutative sets of input pins, with the purpose of improving the wire length of the placement and, as a consequence, reducing the congestion in the resulting routing.

A method and apparatus to optimize for a permutation of the commutative-associative inputs of such logic trees is disclosed. Commutative means that changing the order of the inputs does not change the result. Associative means that the grouping of the inputs does not change the result. Thus, commutative-associative inputs mean that the order of the inputs and the grouping of the inputs can be changed without changing the outcome. Thus, a large commutative-associative tree of logic gates has inputs whose order and grouping does not impact the outcome.

The first phase is to traverse the circuit and, starting from potential root pins, propagate back through their fan-in and collect interchangeable input pins into a wave-front set. The propagation stops when a stop condition is encountered. A stop condition may be encountering nets with multiple fan-out, determining that the accumulated Boolean function indicates that no associative-commutative pins can exist in the fan-in of the currently considered one, or a random stop. In one embodiment, the propagation can be stopped randomly, in which case the resulting collection of pins will represent a cut-set of interchangeable pins in the associative-commutative logic tree. At the end of this first phase, a set of arrays of pins will have been stored for subsequent optimization.

The second phase is to pick an array of pins from the collected set and attempt to find improved permutations of the connections into these pins. In one embodiment, this is approached by framing the problem as an equivalent bipartite matching formulation. The nets connecting the pin array represent the sources, while the pins represent the sinks. The graph between the sources and the sinks can be complete or it can be pruned due to existing design restrictions or based on certain heuristics which may be approximated based on a cost analysis. The costs of the arcs between the sources and the sinks can be based on estimates of the wire length of a certain net (source) if connected to a certain pin (sink) and/or they can be modeled to optimize for timing. This bipartite matching formulation is a classic case of linear programming and can be solved exactly by using a network flow solver. The resulting permutation is then applied to the corresponding arrays of nets and pins via disconnect-connect operations.

Once a pin array has been optimized, in one embodiment, it is removed from the set of arrays. If nets are shared between this array and previously visited ones, they get moved back into the set of suboptimal arrays, since changing the connections of these common nets may have invalidated their previous optimization. The process of optimizing the pin arrays may continue until either all arrays have been declared optimal or certain limits on computational resources have been reached. Such limits may be pre-imposed, or may be based on the amount of time available for this optimization.

At the completion of the second phase, the circuit's wire length will have improved due to permuting the connections into the collected pin arrays. This new version of the netlist, while functionally equivalent to the original one, presents the opportunity of further optimization by incrementally re-placing. In one embodiment, as a third phase in the process, a P&R EDA tool can obtain a new, improved placement.

This three-phase process can be repeated multiple times, since each change to the placement changes the wire lengths of the nets connected to interchangeable pins, and each optimization of such sets of interchangeable connections opens up the possibility of a better placement. Experimentally, we found that this repeating this process improves the wire length and routability of the circuit's design monotonically, with the gain in the quality of the design decreasing with each iteration.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
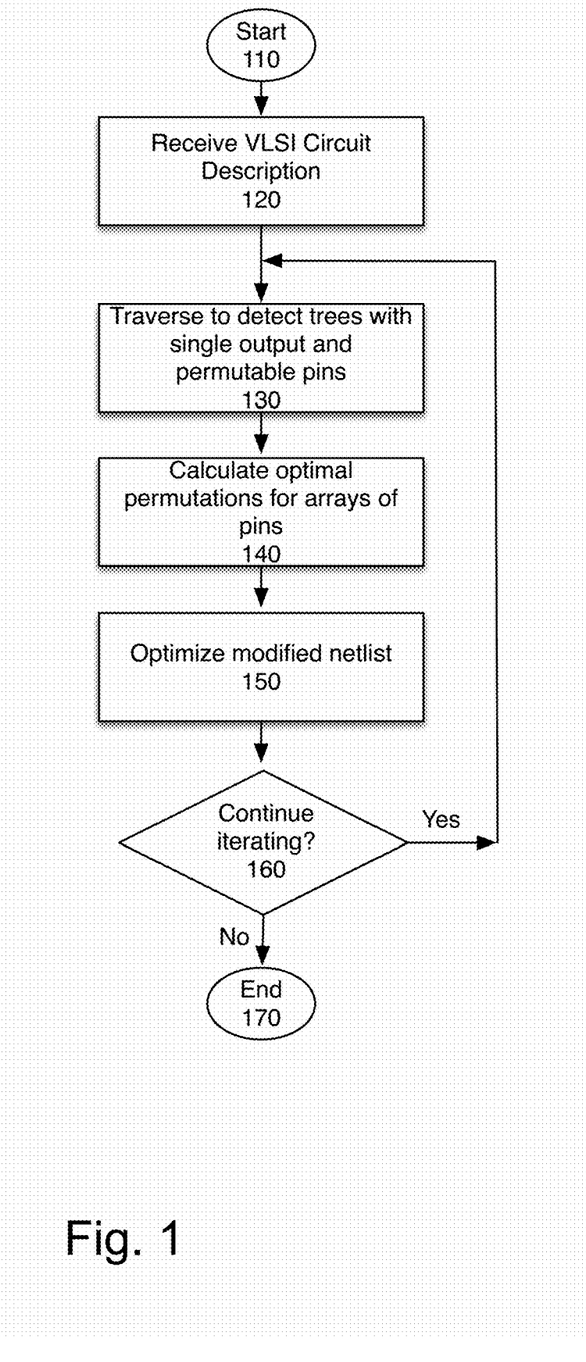
FIG. 1 is a flowchart of one embodiment of the process.

FIG. 1 is an overview flowchart of one embodiment of the process. The process starts when a VLSI circuit description is received. In one embodiment, the circuit description is received in a circuit hypergraph description language, such as LEF/DEF, Verilog, VHDL or other RTL languages, at block 120. In one embodiment, the circuit is stored in memory. At block 130, the circuit is traversed to identify trees of gates that have a single output and a number of pins that are permutable. In one embodiment, a building logic implemented in a computer processor identifies the trees of gates.

At block 140, the process identifies permutations for the arrays of interchangeable logic pins. In one embodiment, a graph logic implemented in a computer processor identifies these permutations. In one embodiment, the permutations are optimized based on a cost function.

At block 150, the modified netlist is optimized by updating the cell locations. In one embodiment, this is done by a netlist logic implemented by the processor. Once the pin arrays have been optimized, the placement which was obtained may be suboptimal for the updated netlist. Therefore, the netlist is optimized, at block 150. In one embodiment, this optimized netlist is stored in memory.

At block 160, the process determines whether to continue iterating. If so, the process returns to block 130, to traverse the circuit and identify trees of gates of optimization. Otherwise, the process ends at block 170. In one embodiment, the iterations may end when the improvement in the wire length or timing in the last iteration was under a threshold. In one embodiment, the iteration may end after a preset number of iterations. In one embodiment, the iterations may end after a pre-allocated budget of time/operations has been used. In one embodiment, the iterations may end when the wire lengths/time meet a certain budget. Other methods of determining when to terminate the iterations may be used.

Figure 2:
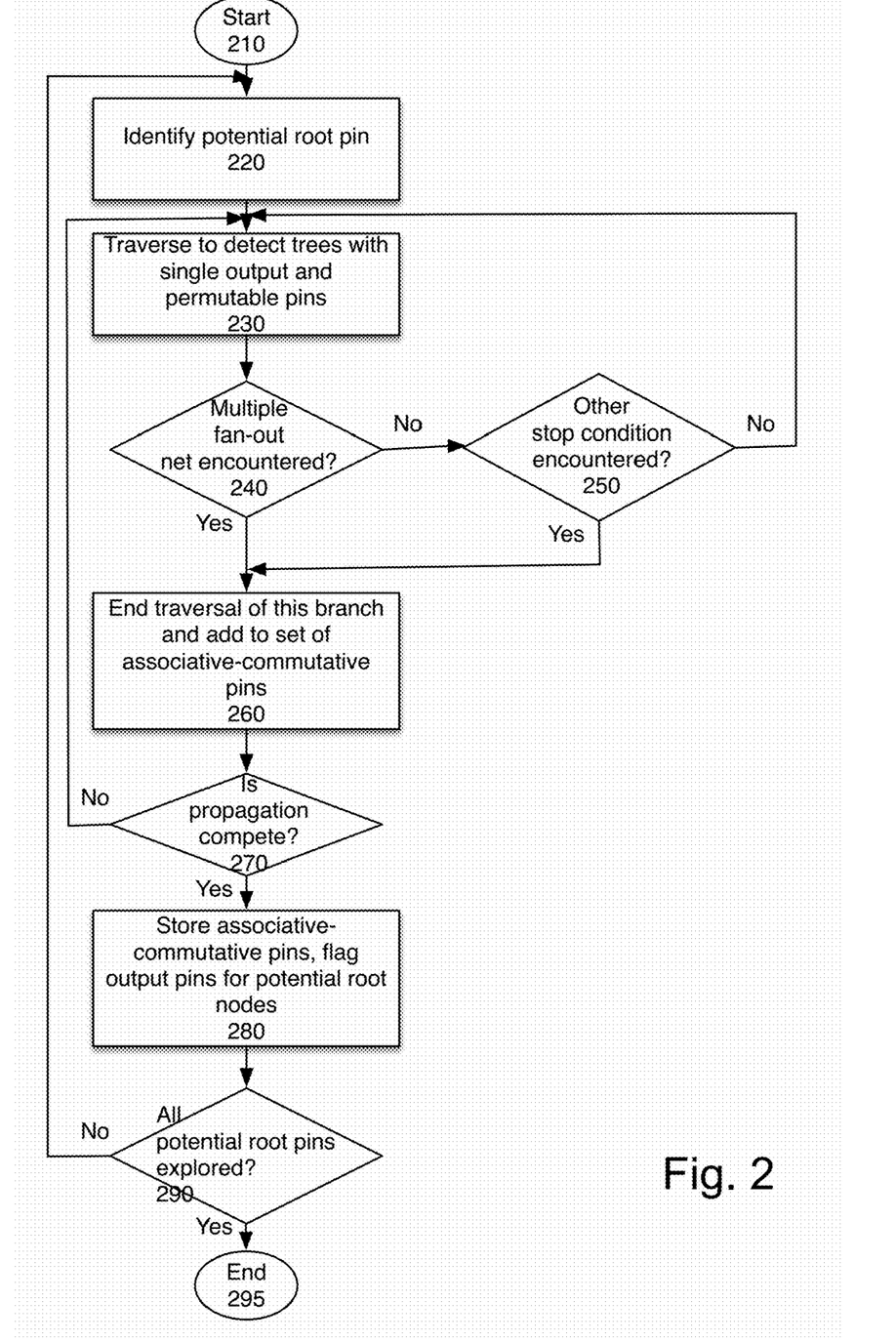
FIG. 2 is a flowchart of one embodiment of identifying single output permutable pins.

FIG. 2 is a flowchart of one embodiment of identifying trees of gates that have a single output and a number of pins that are permutable. The process starts at block 210.

Figure 4A:
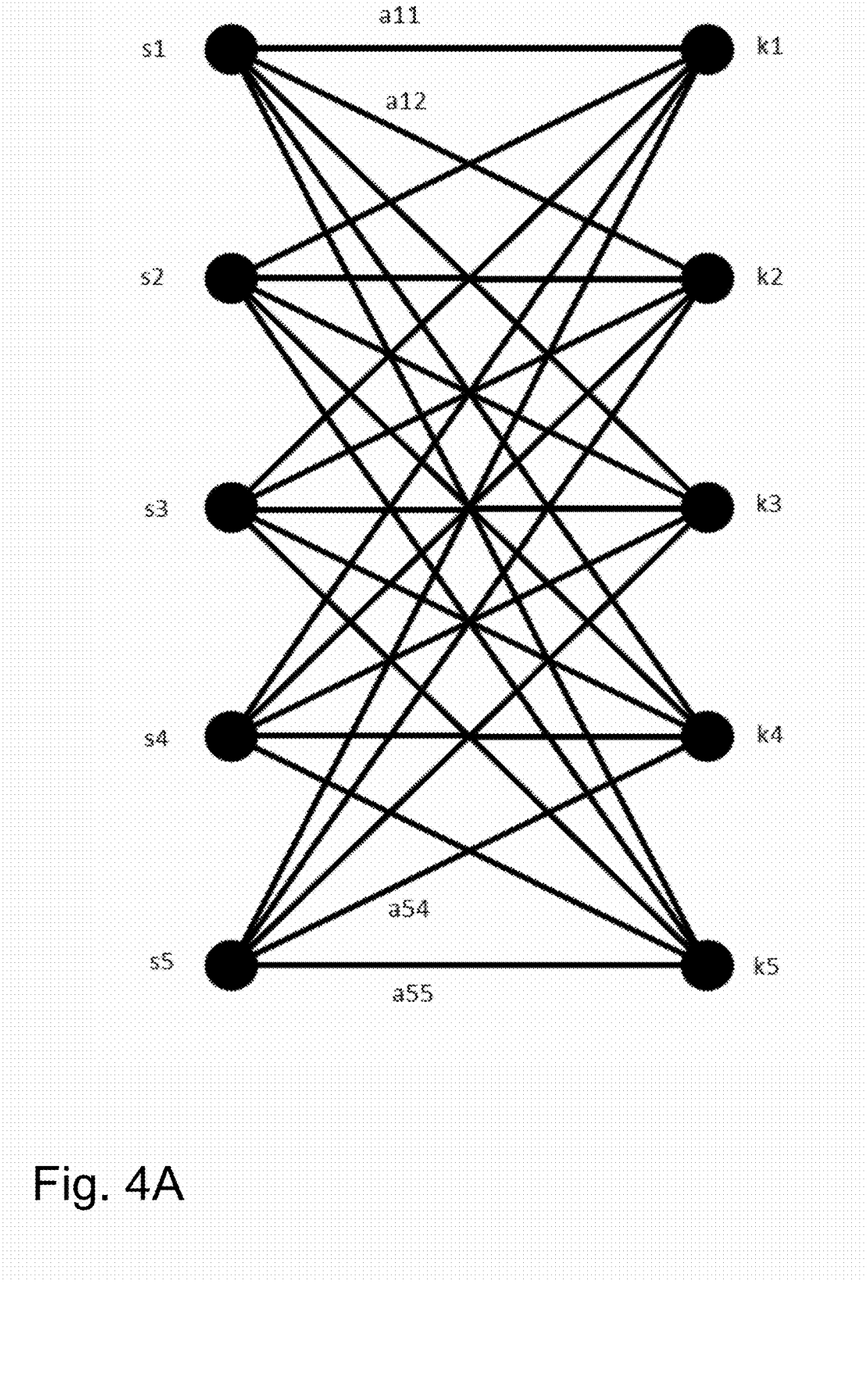
FIG. 4A is an exemplary bipartite graph.
Figure 4B:
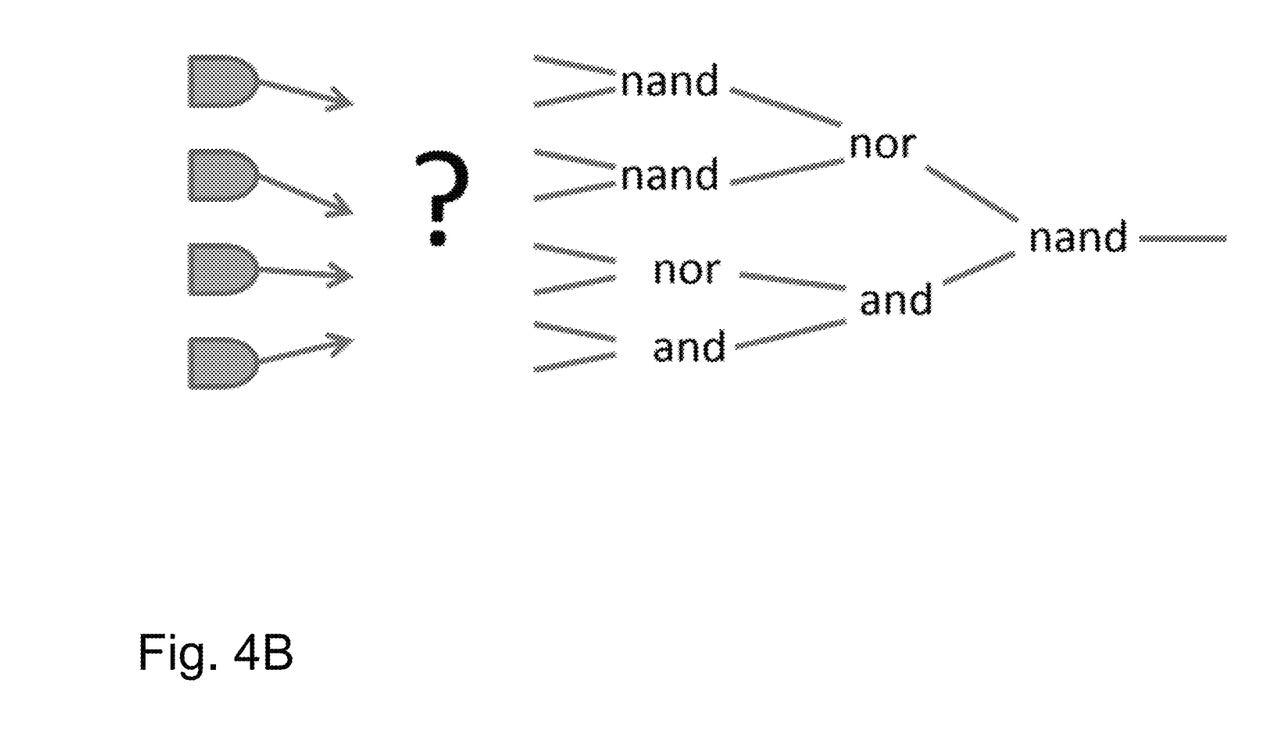
FIG. 4B is an exemplary tree of gates that have a single output and a number of pins that are permutable.

In one embodiment, the process identifies a potential root pin, at block 220 (e.g. an output port or an input pin of a register) and traverses backwards through its fan-in cone, at block 230. In one embodiment, the process uses Boolean algebra to propagate a wave front of interchangeable pins. In one embodiment, the propagation algorithm understands Boolean logic, so it can, for example, find an OR tree that is made from alternating levels of NAND and NOR gates, as shown in FIG. 4.

Returning to FIG. 2, the propagation process determines whether the traversal should be stopped. The traversal is stopped whenever a multiple fan out net is encountered, which is determined at block 240. In one embodiment, design restrictions such as hierarchy boundaries or the presence of timing exception attributes will also stop the process, as determined at block 250.

When a multiple fan-out net is encountered, at block 240, the traversal of this branch is ended, and the tree is added to the set of associative-commutative pins, at block 260. If no multiple fan-out net is encountered, at block 250 the process determines whether another stop condition was encountered. If so, the traversal is ended and the tree is added to the set of associative-commutative pins, at block 260. If neither is encountered, the process returns to block 230 to continue traversal.

At block 270, the process determines whether the propagation is complete. The propagation is complete if all potential branches from the identified root pin have been traversed, in one embodiment. If the propagation is not yet complete, the process returns to block 230 to continue traversing to detect trees.

When propagation from the potential root pin is complete, at block 280, the process stores the set of identified associative-commutative pins. The output pins of the cells driving these pins become potential root nodes for subsequent similar traversals.

At block 290, the process determines whether all potential root pins have been explored. If there are root pins that have not yet been explored, in one embodiment, the process returns to block 220, to identify a new potential root pin and start a new traversal. Otherwise, the process ends at block 295. In one embodiment, this process may be applied only to a portion of a circuit, as noted above. In that case, the propagation may end when the selected subset of root pins has been explored.

Once the process has identified the set of pin arrays, the problem of finding the optimal permutation of each array can be attempted by various approaches. Classical methods, such as repeated two-pin swapping or simulated annealing may be used. In one embodiment, the optimal permutation may be identified by rephrasing as a bipartite matching problem.

Figure 3:
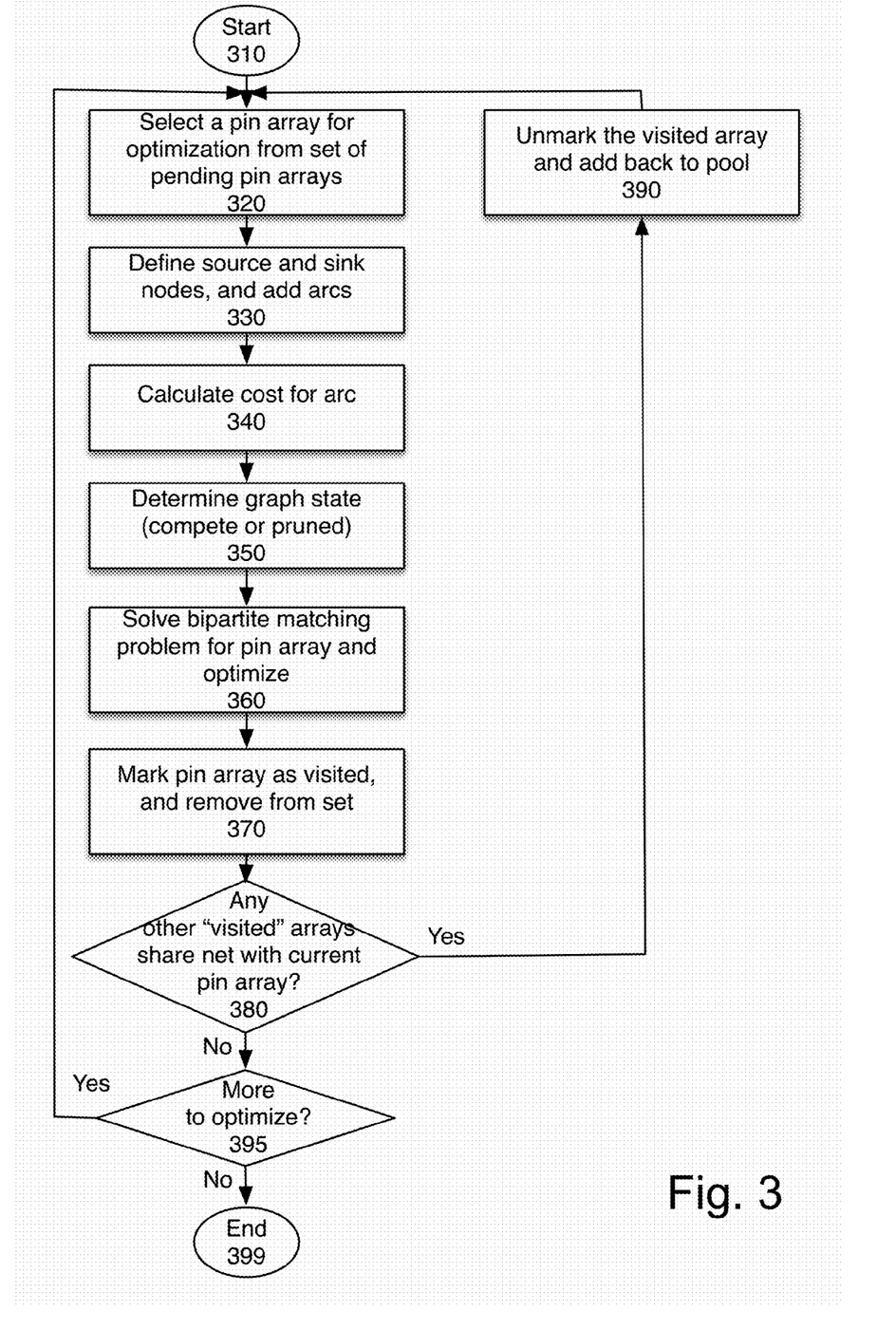
FIG. 3 is a flowchart of one embodiment of using a bipartite matching problem for finding the optimal permutation for an array.

FIG. 3 illustrates one embodiment of using a bipartite matching approach. The process starts at block 310. The input to the process, in one embodiment is a set of pending pin arrays. In one embodiment, these are the pin arrays identified in the process of FIG. 2, described above.

At block 320, one of the pin arrays from the collected set is selected. The selection can be done at random or based on an optimization order (e.g. timing criticality, size of the array, by location or by hierarchy). For the below discussion, we will have $p1, p2, \ldots, pm$ denote the m pins in the selected array and $n1, n2, \ldots, nm$ denote the m nets connected to these pins.

At block 330, the process starts to build a bipartite graph by defining source nodes $s1, s2, \ldots, sm$ representing the m nets and sink nodes $k1, k2, \ldots, km$ representing the m pins. Between any source si and any sink kj, we can add an arc aij. FIG. 4A illustrates an exemplary bipartite graph showing five sources and sinks.

At block 340, the cost for an added arc aij, which has an associated capacity of 1, is defined. In one embodiment, the cost is defined by one of these methods:

The wire length of net ni when it is disconnected from the pin pi and connected to pin pj instead. This version of the cost can be used for attempting to optimize the total wire length of the circuit.

An approximation of the net length above, which can be quickly calculated

The slack of the driver of net ni when it is disconnected from the pin pi and connected to pin pj instead. This version of the cost can be used for attempting to optimize the clock frequency of the circuit.

At block 350, the process determines the graph state as complete or pruned. The bipartite graph can be defined as complete (in the sense that every source has an arc to every sink) or pruned (incomplete). When the graph is incomplete, feasibility of the resulting linear programming problem can be guaranteed by the presence of all n "self-arcs" aij. One reason for using a pruned graph could be concomitant optimization for wire length and timing, by removing all arcs for which the slack of the driver of net ni (when it is disconnected from the pin pi and connected to pin pj instead) is below a certain threshold. Another reason for using a pruned graph could be restricting the difference in the number of levels (of the associative commutative tree) resulting from re-connecting a net.

Figure 5:
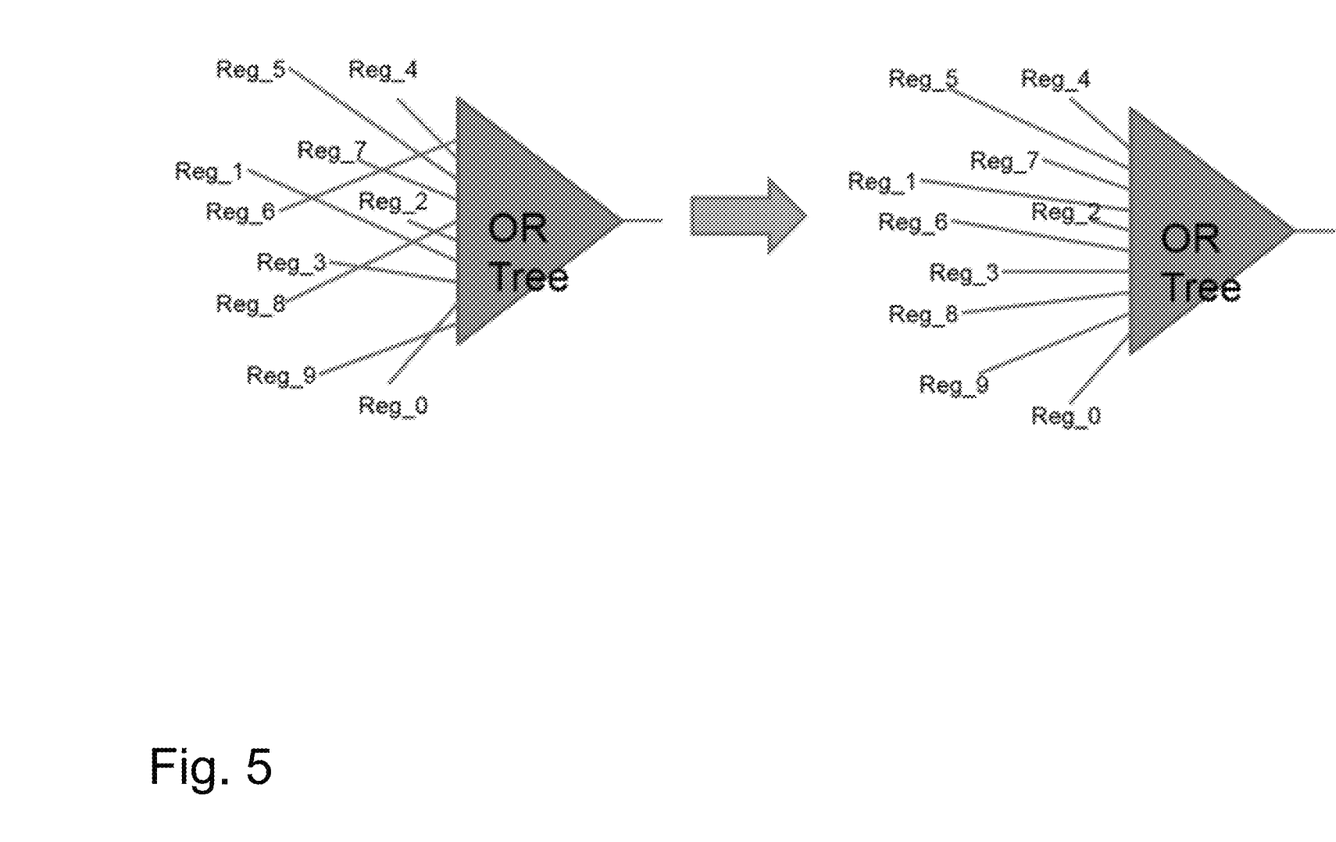
FIG. 5 is an exemplary redesign based on bipartite matching, resulting in a design of the circuit which is logically equivalent but has reduced wire length.

At block 360, the bipartite matching problem is solved. In one embodiment, it is solved by using a classical network flow or linear programming solver. The solution corresponds to an improved matching of the nets ni with the pins pj. Disconnect and connect operations can be used to modify the netlist in accordance with the solution, resulting in a design of the circuit which is logically equivalent but has reduced wire length, as suggested by FIG. 5.

At block 370, after a pin array is restructured by the method above, it gets marked as "visited" and is removed from the set of pin arrays left to visit. It is possible that some of the recently rewired nets are shared between this latest pin array and pin arrays that were already marked as "visited." At block 380, the process determines whether any other previously "visited" arrays share nets with the newly optimized array. The wiring for these previously visited pin arrays is no longer guaranteed to be optimal, because of the optimization for the newly optimized array. Therefore, at block 390, in one embodiment, these other visited arrays are unmarked as "visited" and added back in the pending set of pin arrays left to visit. In another embodiment, these arrays may be marked in a different way, to enable optional re-visiting. By way of example, these pins may be marked as 'previously visited' or 'to-be-visited' to indicate pins that should be re-visited if resources remain available.

At block 395, the process determines whether there are any more pin arrays to be optimized. The process of selecting a pin array, rewiring it and updating the set of pending pin arrays can continue until all pin arrays have been marked as "visited" (and therefore the pending set is empty) or until a pre-allocated budget (of time, number of operations, or other budget factor) has been spent.

If there are more pin arrays to be optimized, the process returns to block 320, to select a pin array. In one embodiment, a pin array not yet marked visited is selected. In one embodiment, a pin array that has never been visited before is selected, prior to selecting previously-optimized but unmarked in arrays. If there are no more pin arrays to be visited, whether because all have been optimized or the budget is used, the process ends at block 399.

Figure 6:
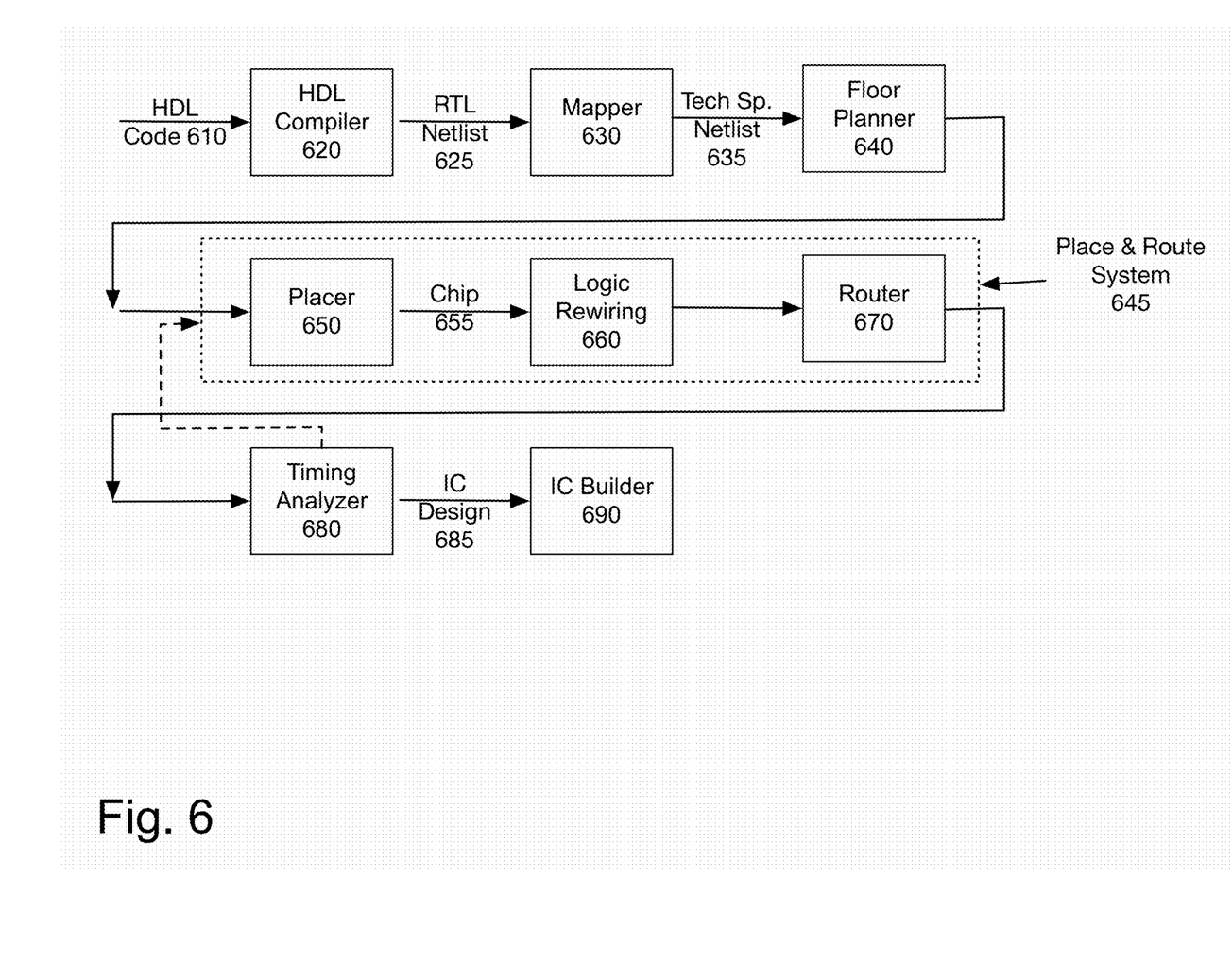
FIG. 6 is a block diagram of one embodiment of a layout optimization system.

FIG. 6 is a simplified block diagram of one embodiment of circuit design. It should be understood by one of skill in the art that some logics are not included that may be included in a typical IC design process, such as functional verification, synthesis, compliance verification, resolution enhancement, etc. For the design of digital circuits on the scale of VLSI (very large scale integration) technology, designers often employ computer-aided techniques. In one embodiment, the elements of this system may be implemented by a processor or plurality of processors in a computer system, as described below with respect to FIG. 7. In one embodiment, the implementation may use a distributed, cloud-based, and/or parallel processing set of processors. The elements may be executed on different devices, at different times.

Standard languages such as Hardware Description Languages (HDLs) 610 have been developed to describe digital circuits to aid in the design and simulation of complex digital circuits. Several hardware description languages, such as VHDL and Verilog, have evolved as industry standards. VHDL and Verilog are general purpose hardware description languages that allow definition of a hardware model at the gate level, the register transfer level (RTL) or the behavioral level using abstract data types. As device technology continues to advance, various product design tools have been developed to adapt HDLs for use with newer devices and design styles.

In designing an integrated circuit with HDL code 610, the code is first written and then compiled by an HDL compiler 620. The HDL source code describes at some level the circuit elements, and the compiler produces an RTL netlist 625 from this compilation. Alternative languages may be chosen, without departing from the spirit or scope of the invention.

The RTL netlist is typically a technology independent netlist in that it is independent of the technology/architecture of a specific vendor's integrated circuit, such as field programmable gate arrays (FPGA) or an application-specific integrated circuit (ASIC). The RTL netlist corresponds to a schematic representation of circuit elements (as opposed to a behavioral representation).

Mapper 630 then maps the RTL netlist, converting from the technology independent RTL netlist 625 to a technology specific netlist 635 which can be used to create circuits in the vendor's technology/architecture. It is well known that FPGA vendors utilize different technologies/architectures to implement logic circuits within their integrated circuits. Thus, the technology independent RTL netlist is mapped to create a netlist which is specific to a particular vendor's technology/architecture.

One operation that is often desirable in this process is to plan the layout of a particular integrated circuit and to control timing problems and to manage interconnections between regions of an integrated circuit. This is sometimes referred to as "floor planning" performed by floor planner 640.

After the logic elements are placed into blocks, the cells (e.g., gates or transistors) are placed and routed in the area for a chip. Place & route system 645 includes placer 650, logic rewiring 660, and router 670. A placer 650 places the cells for the integrated circuit.

Logic rewiring 660 optimizes the ordering of the inputs to large commutative-associative trees of logic gates, as described above. Router 660 routes wires between the cells. In one embodiment, the rewiring phase is integrated in the place & route system 645. The design is read, then placed, rewired, synthetized and routed. Then, the database is updated with the results, which are used by timing analyzer 680. In one embodiment, rewiring logic 660 may be present after timing analyzer 680, after router 670, or in multiple places in the process.

Once the wires are routed, timing analyzer 680 analyzes timing accurately based on the placement and routing information. In one embodiment, the process may return to place & route system 645, based on the results from timing analyzer. As noted, the process can be iterated, from floor planning 640 through analysis 680. When the process is complete, the integrated circuit design 685 may be generated. In one embodiment, the design 685 may be stored in a memory. In one embodiment, the integrated circuit design 685 is made available as an IP core, and may be used in FPGA, ASIC, and other integrated circuits. IC builder 690 may utilize the IC design 685 in producing an integrated circuit.

The above described process of pin optimization would be considered part of the placer 650 and rewiring logic 660, in which the circuit is laid out prior to completing routing.

Figure 7:
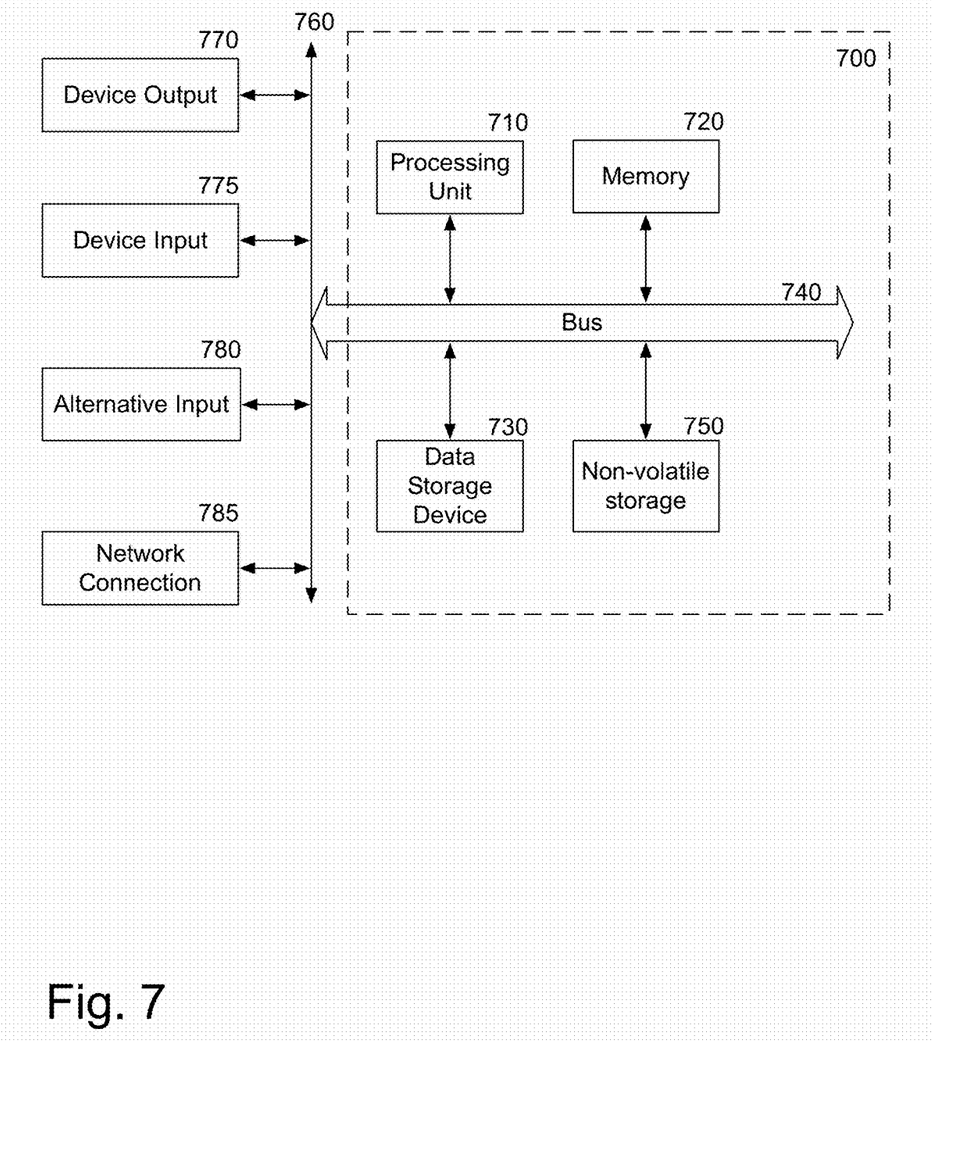
FIG. 7 is a block diagram of a computer system that may be used in the present invention.

FIG. 7 is a block diagram of one embodiment of a computer system that may be used with the present invention. It will be apparent to those of ordinary skill in the art, however that other alternative systems of various system architectures may also be used.

The data processing system illustrated in FIG. 7 includes a bus or other internal communication means 740 for communicating information, and a processing unit 710 coupled to the bus 740 for processing information. The processing unit 710 may be a central processing unit (CPU), a digital signal processor (DSP), or another type of processing unit 710.

The system further includes, in one embodiment, a random access memory (RAM) or other volatile storage device 720 (referred to as memory), coupled to bus 740 for storing information and instructions to be executed by processor 710. Main memory 720 may also be used for storing temporary variables or other intermediate information during execution of instructions by processing unit 710.

The system also comprises in one embodiment a read only memory (ROM) 750 and/or static storage device 750 coupled to bus 740 for storing static information and instructions for processor 710. In one embodiment, the system also includes a data storage device 730 such as a magnetic disk or optical disk and its corresponding disk drive, or Flash memory or other storage which is capable of storing data when no power is supplied to the system. Data storage device 730 in one embodiment is coupled to bus 740 for storing information and instructions.

The system may further be coupled to an output device 770, such as a cathode ray tube (CRT) or a liquid crystal display (LCD) coupled to bus 740 through bus 760 for outputting information. The output device 770 may be a visual output device, an audio output device, and/or tactile output device (e.g. vibrations, etc.)

An input device 775 may be coupled to the bus 760. The input device 775 may be an alphanumeric input device, such as a keyboard including alphanumeric and other keys, for enabling a user to communicate information and command selections to processing unit 710. An additional user input device 780 may further be included. One such user input device 780 is cursor control device 780, such as a mouse, a trackball, stylus, cursor direction keys, or touch screen, may be coupled to bus 740 through bus 760 for communicating direction information and command selections to processing unit 710, and for controlling movement on display device 770.

Another device, which may optionally be coupled to computer system 700, is a network device 785 for accessing other nodes of a distributed system via a network. The communication device 785 may include any of a number of commercially available networking peripheral devices such as those used for coupling to an Ethernet, token ring, Internet, or wide area network, personal area network, wireless network or other method of accessing other devices. The communication device 785 may further be a null-modem connection, or any other mechanism that provides connectivity between the computer system 700 and the outside world.

Note that any or all of the components of this system illustrated in FIG. 7 and associated hardware may be used in various embodiments of the present invention.

It will be appreciated by those of ordinary skill in the art that the particular machine that embodies the present invention may be configured in various ways according to the particular implementation. The control logic or software implementing the present invention can be stored in main memory 720, mass storage device 730, or other storage medium locally or remotely accessible to processor 710.

It will be apparent to those of ordinary skill in the art that the system, method, and process described herein can be implemented as software stored in main memory 720 or read only memory 750 and executed by processor 710. This control logic or software may also be resident on an article of manufacture comprising a computer readable medium having computer readable program code embodied therein and being readable by the mass storage device 730 and for causing the processor 710 to operate in accordance with the methods and teachings herein.

The present invention may also be embodied in a handheld or portable device containing a subset of the computer hardware components described above. For example, the handheld device may be configured to contain only the bus 740, the processor 710, and memory 750 and/or 720.

The handheld device may be configured to include a set of buttons or input signaling components with which a user may select from a set of available options. These could be considered input device #1 775 or input device #2 780. The handheld device may also be configured to include an output device 770 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above, such as a kiosk or a vehicle. For example, the appliance may include a processing unit 710, a data storage device 730, a bus 740, and memory 720, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 785.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 710. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A computer-implemented method of optimizing ordering inputs to large commutative-associative trees of a plurality of logic gates when designing an integrated circuit comprising:
building a plurality of pin arrays by traversing a netlist representation of the integrated circuit from a plurality of potential root pins associated with plurality of logic gates through fan-in;
collecting interchangeable input pins into a wave-front set until a stop condition is encountered;
building a bipartite graph to find a permutation of connections into the input pins of a selected pin array, wherein the permutation is based on a cost analysis;
modifying the netlist based on the permutation;
optimizing the modified netlist; and
making an integrated circuit design from the optimized modified netlist, the integrated circuit design made available as an IP core for manufacturing the integrated circuit.

2. The method of claim 1, further comprising:
applying the permutation to the selected array of nets and pins using disconnect-connect operations.

3. The method of claim 1, wherein the stop condition is one of: encountering a net with multiple fan-out, determining that no associative-commutative pins can exist in the fan-in of the wave front, or a random stop.

4. The method of claim 1, further comprising:
marking the selected pin array as visited, after the modifying.

5. The method of claim 4, further comprising:
determining whether a different pin array that is marked as visited shares a net with the selected pin array; and
moving the different pin array into a to be visited list, when the different pin array shares the net.

6. The method of claim 1, wherein the optimization of the pin array is done by one or more of: repeated pin swapping, simulated annealing, and rephrasing as a bipartite matching problem.

7. The method of claim 1, further comprising:
iterating the building of the bipartite graph to find the permutation and the modifying of the netlist based on the permutation with incremental re-placement for continued improvements in a quality of a design of the circuit.

8. The method of claim 1, wherein the cost analysis comprises:
utilizing a linear solver to estimate cost based on one or more of: a wire length of a certain net connected to a certain pin, and modeling an arc between the certain net and the certain pin to optimize for timing.

9. A computer-implemented method of designing an integrated circuit comprising:
receiving a netlist representation of an integrated circuit, including a plurality of pins;
building a plurality of pin arrays by traversing the netlist representation from a plurality of potential root pins associated with plurality of logic gates;
selecting a pin array and collecting interchangeable input pins until a stop condition is encountered;
building a bipartite graph to find a permutation of connections into the input pins of the selected pin array, wherein the permutation is based on a cost analysis;
modifying the netlist representation based on the permutation;
optimizing the modified netlist; and
making an integrated circuit design from the optimized modified netlist, the integrated circuit design made available as an IP core for manufacturing the integrated circuit.

10. The method of claim 9, further comprising:
applying the permutation to the selected array of nets and pins using disconnect-connect operations.

11. The method of claim 9, wherein the stop condition is one of:
encountering a net with multiple fan-out, determining that no associative-commutative pins can exist in the fan-in, or a random stop.

12. The method of claim 9, further comprising:
marking the selected pin array as visited.

13. The method of claim 12, further comprising:
when a previously visited pin array shares a net with the selected pin array, moving the previously visited pin array to a to-be-visited list.

14. The method of claim 13, further comprising:
selecting the previously visited pin array for the collecting.

15. The method of claim 9, wherein the optimization of the pin array is done by one or more of: repeated pin swapping, simulated annealing, and rephrasing as a bipartite matching problem.

16. The method of claim 9, further comprising:
iterating the building the bipartite graph to find the permutation and the modifying of the netlist based on the permutation with incremental re-placement for continued improvements in a quality of a design of the circuit.

17. The method of claim 9, wherein the cost analysis comprises:
utilizing a linear solver to estimate cost based on one or more of: a wire length of a certain net connected to a certain pin, and modeling an arc between the certain net and the certain pin to optimize for timing.

18. A system of designing an integrated circuit comprising:
a memory to receive and store a netlist representation of an integrated circuit, including a plurality of pins;
a processor to implement a building logic to traverse the netlist representation from a plurality of potential root pins associated with plurality of logic gates and build a plurality of pin arrays;
the processor to implement a graph logic to select a pin array and collect interchangeable input pins until a stop condition is encountered and build a bipartite graph to find a permutation of connections into the input pins of the selected pin array, wherein the permutation is based on a cost analysis; and
the processor to implement a netlist logic to modify the netlist representation based on the permutation and optimize the modified netlist; and the memory to store optimized modified netlist,
wherein the optimized modified netlist is utilized to making an integrated circuit design and the integrated circuit design is made available as an IP core for manufacturing the integrated circuit.

19. The system of claim 18, wherein the stop condition is one of: encountering a net with multiple fan-out, determining that no associative-commutative pins can exist in the fan-in, or a random stop.

20. The system of claim 18, wherein the selected pin array is marked as visited in the memory, and further comprising when a previously visited pin array shares a net with the selected pin array, marking the previously visited pin array in the memory as to-be-visited.

* * * * *